United States Patent
Loh et al.

(12)

(10) Patent No.: US 6,880,651 B2
(45) Date of Patent: Apr. 19, 2005

(54) ARTICULATED VEHICLE, AN ARTICULATION DEVICE AND A DRIVE TRANSMISSION

(75) Inventors: Heng Fong Loh, Singapore (SG); Jun Shu, Singapore (SG); Shi Jin Tu, Singapore (SG); Choon Mong Tay, Singapore (SG); Dominic Phoon Yong Soon, Singapore (SG); Yew Chuen Poon, Singapore (SG); Hin Chee Leong, Singapore (SG)

(73) Assignee: Singapore Technologies Kinetics Ltd., Singapore (SG)

( * ) Notice: Subject to any disclaimer, the term of this patent is extended or adjusted under 35 U.S.C. 154(b) by 0 days.

(21) Appl. No.: 10/678,250

(22) Filed: Oct. 3, 2003

(65) Prior Publication Data

US 2004/0226760 A1 Nov. 18, 2004

(30) Foreign Application Priority Data

May 14, 2003 (SG) .......................................... 200302856

(51) Int. Cl.⁷ .............................................. B62D 53/00
(52) U.S. Cl. ....................... 180/14.2; 180/9.4; 180/14.4; 180/14.7; 180/85.4
(58) Field of Search ........................ 180/94, 9.44, 14.1, 180/14.2, 14.4, 14.7, 6.7, 65.2, 65.4, 243

(56) References Cited

U.S. PATENT DOCUMENTS

| | | | | |
|---|---|---|---|---|
| 3,035,654 A | * | 5/1962 | Nuttall, Jr et al. .......... | 180/14.4 |
| 4,645,023 A | * | 2/1987 | Rea et al. ................... | 180/9.32 |
| 4,762,191 A | | 8/1988 | Hagin et al. ................ | 180/14.2 |
| 4,934,300 A | * | 6/1990 | Seligman et al. .......... | 440/12.56 |
| 5,113,958 A | | 5/1992 | Holden ........................ | 180/9.4 |
| 5,373,909 A | | 12/1994 | Dow et al. ................... | 180/9.1 |
| 2003/0205422 A1 | * | 11/2003 | Morrow et al. ............. | 180/65.2 |
| 2003/0234124 A1 | * | 12/2003 | Pecnik et al. ............... | 180/65.2 |
| 2004/0020697 A1 | * | 2/2004 | Field ........................... | 180/65.2 |
| 2004/0226763 A1 | * | 11/2004 | Kim ............................ | 180/65.4 |

* cited by examiner

*Primary Examiner*—Daniel G. DePumpo
(74) *Attorney, Agent, or Firm*—Cantor Colburn LLP (57) ABSTRACT

An articulated vehicle is made up of two independently moveable vehicle bodies, for instance tracked vehicle bodies. The first vehicle body has an engine and the second one has a motor/generator. An articulation device connects them to allow the first vehicle body to drive the second vehicle body or vice versa or even for them to act together. A drive transmission that can be used in the vehicle allows power to be input from two shafts or for one of the shafts to be an additional power output. An articulation device that can be used in the vehicle allows quick alignment and/or coupling and decoupling of the two bodies.

16 Claims, 6 Drawing Sheets

ARTICULATED VEHICLE, AN ARTICULATION DEVICE AND A DRIVE TRANSMISSION

FIELD OF THE INVENTION

The present invention relates to an articulated vehicle, where a pair of wheeled or tracked bodies is articulated together. In particular, it relates to such a vehicle having a hybrid drive to power both bodies when articulated, which bodies can be uncoupled, allowing both bodies can drive independently of each other.

The present invention also relates to an articulation device, whether for a pair of wheeled or tracked bodies or for other uses. In particular it relates to such a device having a release mechanism, more particularly a quick release.

The present invention additionally relates to drive transmission, whether for an articulated vehicle or otherwise. In particular it relates to such a transmission having more than one input and traction control.

BACKGROUND OF THE INVENTION

Articulated wheeled vehicles are well known in the form of articulated lorries, where a front portion with an engine pulls a trailer, the front portion also having electrical and brake control over the trailer. Other examples include articulated buses, where a front portion pulls a rear portion. Further, published patent document U.S. Pat. No. 4,762,191 describes an articulated bus with a hybrid drive system, with an IC engine in the front portion and an electric motor in the rear portion.

Articulated tracked vehicles are also known. For instance, published patent document U.S. Pat. No. 5,113,958 describes an articulated tracked snow travel vehicle, whilst published patent document U.S. Pat. No. 5,373,909 describes an articulated tracked vehicle for agricultural harvesting. In the first of these documents, the rear body has an internal combustion engine and drives the complete articulated vehicle. In the second of these two documents, both bodies have hydraulic motors and therefore drive themselves. It is also known to provide an articulated tracked vehicle with an internal combustion engine in the first body for driving the first body, with a driving linkage from the engine to the second body to drive the tracks of that one too.

A single tracked body usually has two track bands, one on each side. Steering of a single bodied vehicle is achieved by causing a traction difference between the two-track bands. During straight driving, the movement of one track band relative to the other is braked. During cornering, traction control is either achieved by applying mechanical friction braking to the inner track band, or by transferring kinetic energy from inner track band to the other by means of a zero shaft (regenerative steering). The latter approach can virtually reverse the movement of one track band relative to the other, when the body is stationary to achieve pivot steer.

However, in the case of an articulated tracked vehicle, steering tends to be achieved differently. Both the above-mentioned document U.S. Pat. Nos. 5,113,958 and 5,373,909, show hydraulic cylinders incorporated into the articulation mechanism between the two bodies. These are controlled to initiate a relative angle between the two bodies (active yaw control), which results in a turn. In wheeled vehicles steering tends not to be so much of a problem where the wheels can pivot. In the case of a four-wheeled rear portion, the front pair tends to pivot with the trailer link. In the case of a two-wheeled rear portion, as in document U.S. Pat. No. 4,762,191, the rear portion is easily turned on just two wheels.

SUMMARY OF THE INVENTION

According to one aspect of present invention, there is provided an articulated vehicle comprising at least a first vehicle body and a second vehicle body, with an articulation device therebetween. The first vehicle body comprises a first drive means for driving the first vehicle body when it is separate from the second vehicle body. The second vehicle body comprises a second drive means for driving the second vehicle body when it is separate from the first vehicle body. The first drive means is operable to drive both the first and second vehicle bodies when the first drive vehicle body is articulated thereto. The second drive means is operable to drive both the first and second vehicle bodies when the second vehicle body is articulated thereto; and the first and second vehicle bodies are independently steerable when separate.

This invention also covers the separate first and second vehicle bodies.

According to another aspect of the invention, there is provided a steerable and independently drivable vehicle body. The vehicle body comprises drive means to provide power to drive the vehicle body; and a power input shaft to be rotated from outside said vehicle body, to drive the vehicle body, with or without power from the drive means and operable to be rotated by said drive means.

According to a further aspect of the invention, there is provided a drive transmission. The drive transmission comprises a first power input means; a second power input means coupled to the first power input means; and two power output means, coupled to the input means through a clutch. The first power input means is operable to input power without additional power being provided by the second power input means. The second power input means is operable to input power without additional power being provided by the first power input means. The second power input means is operable to input power in addition to power provided by the first power input means.

According to another further aspect of the invention, there is provided an articulation device comprising first and second articulation portions. The first and second articulation portions are couplable to and releasable from each other by the operation of one or more actuators.

According to again a further aspect of the invention, there is provided an articulation device. The articulation device comprises first and second articulation portions, having coupling faces for coupling to each other. The faces are shaped such that when one approaches the other, it is automatically aligned to a particular relative position and orientation.

The drive transmission and articulation device can be used with the articulated vehicle of the first aspect, or in other situations.

BRIEF DESCRIPTION OF THE DRAWINGS

The invention will be further described by way of non-limitative examples, with reference to the accompanying drawings, in which.

DETAILED DESCRIPTION

In the drawings and description, like numerals on different figures are used to indicate like elements throughout.

An articulated tracked vehicle of an embodiment of the invention is made up of two independently moveable tracked vehicle bodies. The first tracked body has an engine and the second one has a motor/generator. An articulation device connects them to allow the first body to drive the second body or vice versa or even for them to act together. A drive transmission that can be used in the vehicle allows power to be input from two shafts or for one of the shafts to be an additional power output. An articulation device that can be used in the vehicle allows quick alignment and/or coupling and decoupling of the two vehicle bodies.

Figure 1:
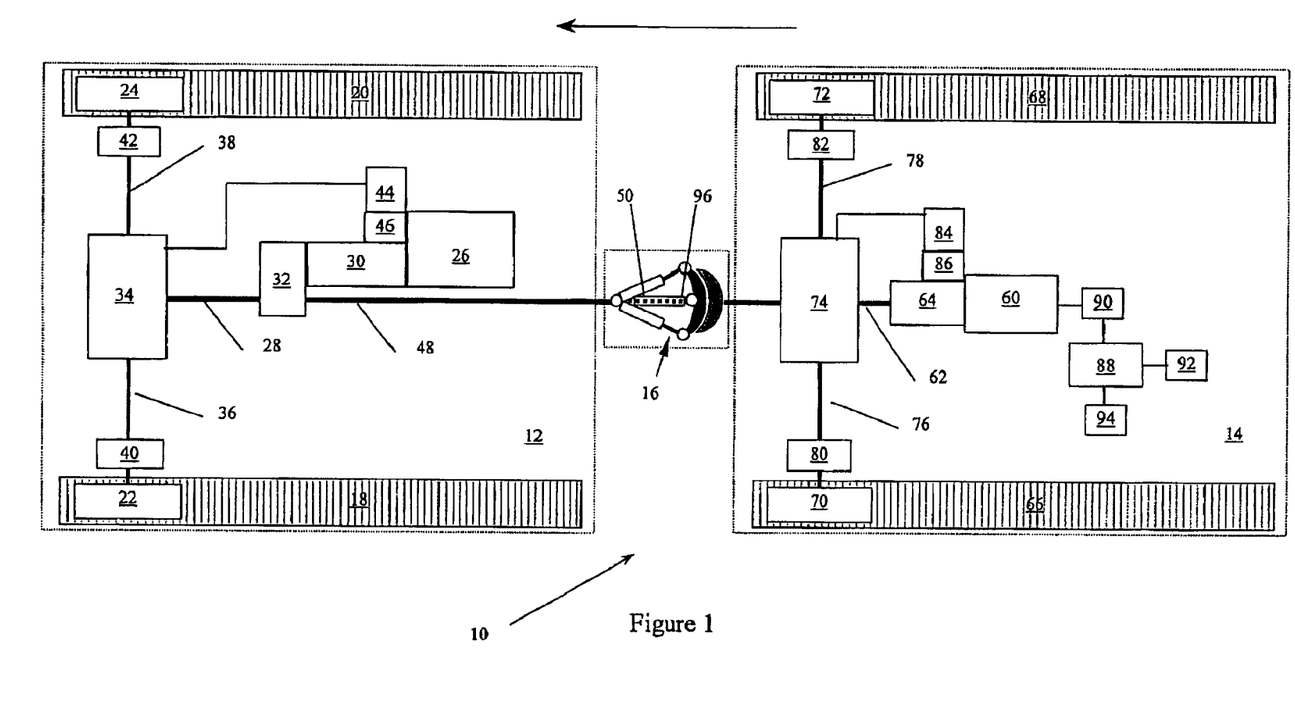
FIG. 1 is a schematic block diagram of a drive train of a tracked vehicle according to a first embodiment of the invention.

FIG. 1 is a schematic view showing the drive train of an articulated tracked vehicle 10 according to a first embodiment of the invention. The tracked vehicle 10 has a front body 12 and a rear body 14 articulated together by an articulation device 16.

The front body 12 has a left and right track bands 18, 20 which are driven by left and right sprockets 22, 24 respectively. An engine 26, for example an internal combustion engine such as a diesel engine, provides the main power to the front body 12. It drives a front body front drive shaft 28 via a front gearshift 30 and a drop box 32. A front drive transmission unit 34 transmits drive power from the front body front drive shaft 28 to left and right output shafts 36, 38 linked to final drives 40, 42 and thereafter to the sprockets 22, 24. An hydraulic steering pump 44 is provided to give hydraulic power to an hydraulic motor within the drive unit 34 (or the hydraulic motor can be otherwise associated with the drive unit 34, for instance being outside it). The power for the hydraulic pump 44 is provided from the front gearshift 30 through a power take out train 46, although it could be provided more directly from the engine in other embodiments.

The engine 26 in this embodiment is situated behind the front drive unit 34. The drop box 32 has two output shafts. The front body front drive shaft 28 extends forwards into the front drive unit 34. A front body rear drive shaft 48 extends backwards out of the rear of the front body 12, where it is flexibly linked to a front articulation shaft 50, within the articulation device 16.

The drive train within the rear body 14 is similar to that within the front body 12. However, there is a motor/generator 60, instead of the engine 26, providing power to a rear body drive shaft 62 via a rear gearshift 64, without a drop box in between. As in the front body, left and right track bands 66, 68 in the rear body are driven by left and right sprockets 70, 72 respectively. The sprockets 70, 72 are powered from the rear body drive shaft 62 via a rear drive unit 74, via left and right rear body output shafts 76, 78 linked to rear body final drives 80, 82. Again, as in the front body, an hydraulic pump 84 provides hydraulic power to an hydraulic motor within the rear drive unit 74. The rear hydraulic pump 84 is powered by the rear gearshift 64 through a rear power take out 86, although it could be provided more directly from the motor in other embodiments.

The motor/generator 60 can act as a generator when need be, either when powered directly by the engine of the front body, for instance when the vehicle is idling, or through regenerative braking. It is connected to battery 88 via an inverter/controller 90. This battery 88 supplies power to the motor/generator 60 when that is being used as a motor. It can also provide power for other uses, for instance to a DC/AC converter 92 and a DC/DC converter 94.

The motor/generator 60 in this embodiment is situated behind the rear drive unit 74. The rear body drive shaft 62 extends forwards into the rear drive unit 74 and out through the front of the rear body 14, where it is flexibly linked to a rear body articulation shaft 96 which is linked to the front body articulation shaft 50.

The front and rear body articulation shafts 50, 96 connect the front body rear drive shaft 48 and the rear body drive shaft 62. This allows the engine 26 to power the rear drive unit 74, thereby to drive the rear sprockets 70, 72 and thereby the rear body 14. Conversely, it allows the motor 60 of the rear body 14 to drive the front body front drive shaft 28 and thereby the front drive unit 34, thereby to drive the front sprockets 22, 24 and thereby the front body 12. Additionally, the engine 26 and motor 60 can work together; the motor 60 providing a boost to the power provided by the engine 26, if that is the prime mover, or vice versa if the motor 60 is the prime mover. Further, during vehicle drive, the engine 26 can provide drive power not only to the drive units 34, 74, but also to drive the motor 60, working as a generator providing charge to the battery 88. Thus the combined drive train of the vehicle allows the engine 26 and motor 60 to exercise hybrid drive. This provides the standard advantages of hybrid drive in terms of power boost, regenerative braking, battery charging etc., together with more silent movement when driven by just the motor. By this arrangement, the motor 60 can also act as engine starter.

The articulation device 16 is also disengageable from the rear body and when disengaged the two separate bodies can act independently, the front body 12 being driven solely by the engine 26 and the rear body 14 solely by the motor 60. Alternatively, the articulation device 16 could be disengageable from the front body or selectively disengageable from either body.

The front and rear body articulation shafts 50, 96 pass through the articulation device 16 to transmit power between the front and rear bodies 12, 14. The articulation device 16 also allows pitch, yaw and roll rotations for the two bodies 12, 14 relative to each other. The pitch, yaw and roll can be actively controlled via hydraulic, electrical or mechanical means or they can be passive. Disconnection of the articulation device, which allows independent drive for each body, can be achieved through a quick disconnect mechanism.

The articulation device 16 has active (powered) yaw control, even though the front and rear cabins have traction control capability, which allows them to steer independently when separated. Such active yaw control is useful in articulated vehicles where the ratio of the distance from the front-most point of the track of the front body in contact with the ground to the rear-most point of the track of the rear body in contact with the ground (L) to the distance between the left and right track center lines (C) is greater than 2 (i.e. UC>2), which is the theoretical limit of skid steering, or greater than 1.8 (i.e. LC>1.8) which is the practical limit. The power for the active yaw control is derived from an auxiliary hydraulic pump (not shown).

Figure 2:
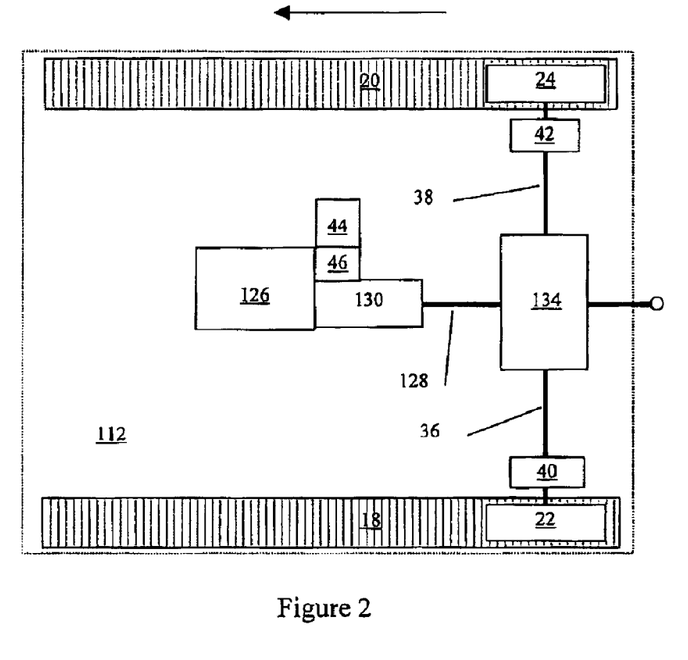
FIG. 2 is a schematic block diagram of a drive train of a front tracked body of a vehicle according to a second embodiment of the invention.

FIG. 2 shows a block diagram of a drive train of a front body 112 of a vehicle according to a second embodiment of the invention. The front body 112 in this embodiment is similar to the front body of the first embodiment, having similar components but without a drop box since the engine 126 is situated in front of the front drive unit 134. The engine 126 drives the front body drive shaft 128 directly through a gear box 130. The front body drive shaft 128 extends backwards into the front drive unit 134 and continues out of the rear of the front body 112, where it is flexibly linked to a rear body articulation shaft, as in the first embodiment.

Figure 3:
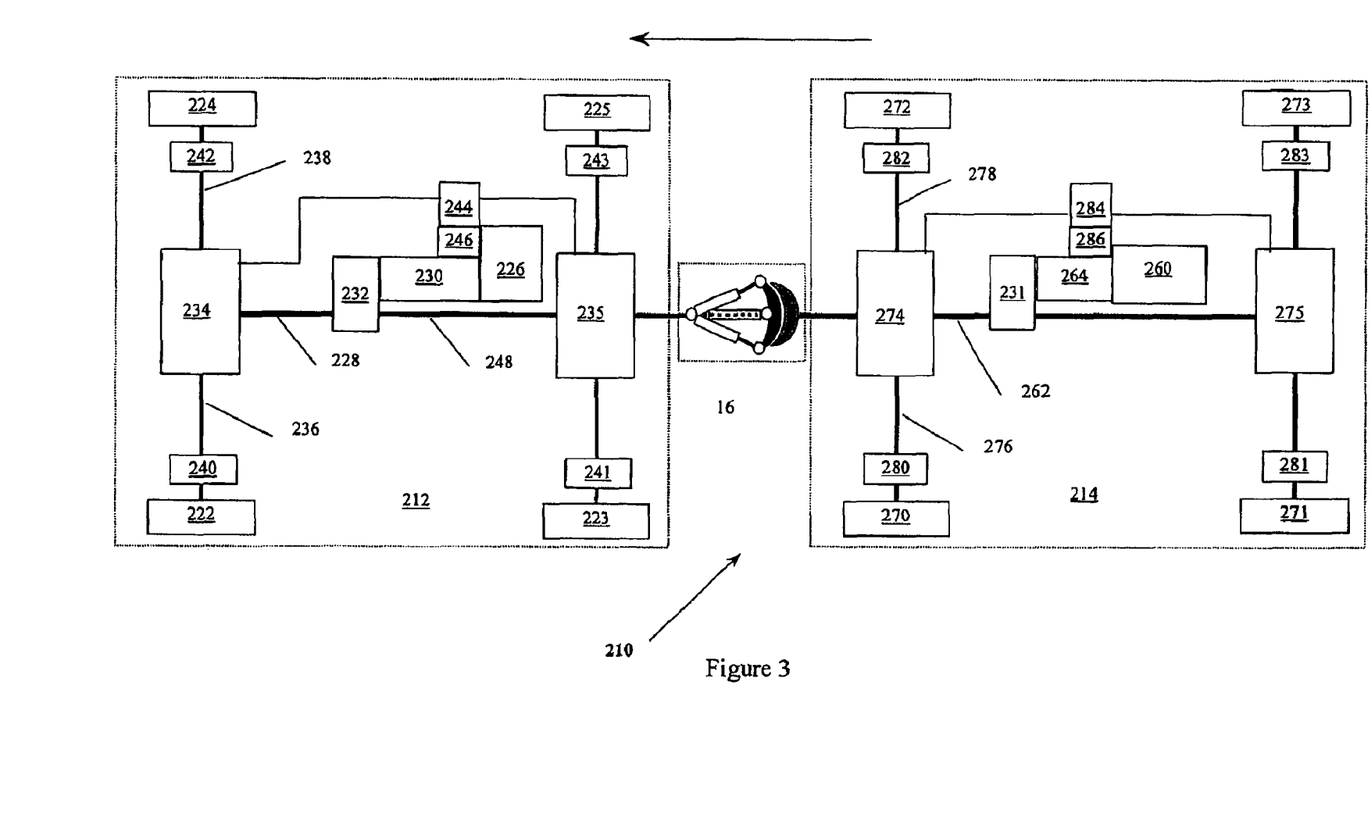
FIG. 3 is a schematic block diagram of a drive train of a wheeled vehicle according to a third embodiment of the invention.

FIG. 3 shows a block diagram of a drive train of an articulated vehicle 210 according to a third embodiment of the invention. This drive train is similar to that of the first embodiment except that it is a wheeled vehicle, with four wheels on each body, rather than a tracked vehicle.

The front body 212 has left side wheels 222, 223 and right side wheels 224, 225. An engine 226 drives a front body front drive shaft 228 and a front body rear drive shaft 248 via a front gearshift 230 and a drop box 232. A front body forward drive unit 234 transmits drive power from the front body front drive shaft 228 to left and right forward output shafts 236, 238 linked to forward final drives 240, 242 and thereafter to the front left and right wheels 222, 224. Likewise a front body rear drive unit 235 transmits drive power from the front body rear drive shaft 248 to left and right rear output shafts linked to rear final drives 241, 243 and thereafter to the rear left and right wheels 223, 225. An hydraulic pump 244 provides hydraulic power to hydraulic motors within the forward and rear drive units 234, 235. The power for the hydraulic pump 244 is provided from the front gearshift 230 through a power take out train 246, although it could be provided more directly from the engine in other embodiments.

In the rear body 214, there is a motor/generator 260, providing power to a rear body forward drive shaft 262 and a rear body rear drive shaft via a rear gearshift 264, and a drop box 231. Front left and right wheels 270, 272 are powered from the rear body forward drive shaft 262 via a rear body forward drive unit 274, via left and right rear body output shafts 276, 278 linked to rear body final drives 280, 282. Rear left and right wheels 271, 273 are powered from the rear body rear drive shaft via a rear body rear drive unit 274, via left and right rear body output shafts 276, 278 linked to rear body final drives 280, 282. An hydraulic pump 284 provides hydraulic power to hydraulic motors within the rear drive units 274, 275. The rear hydraulic pump 284 is powered by the rear gearshift 264 through a rear power take out 286, although it could be provided more directly from the motor in other embodiments.

The two bodies 212, 214 are articulated with articulation device 16. In this preferred embodiment, the wheels of the two bodies need not be pivoted to turn the vehicle. Instead, each body is provided with traction control and, when separated, relies on skid steering (with the capability of regenerative steering too) or pivot steering. When the two bodies are articulated together, these forms of steering are generally no longer available as the ratio of the distance from the center of the front-most wheel of the front body in contact with the ground to the center of the rear-most wheel of the rear body in contact with the ground (L) to the distance between the left and right wheel center lines (C) is greater than 1.8. Thus steering of the combined vehicle is again achieved through active yaw control of the articulation device. Because steering is possible for both the combined vehicle or when the bodies are separated, no extra space is needed to turn the wheels (for example an Ackerman mechanism). As such, there is extra space available, for instance to increase internal volume.

As with the first embodiment, the two bodies can operate separately and independently or, when connected, the first body can drive the second body or vice versa or they can even act together.

Another advantage of a hybrid vehicle of the invention with this hybrid drive train design is in the payload it makes available. The engine and gearshift can themselves weigh several tonnes, especially in a large lorry or tracked vehicle. On the other hand the motor/generator and battery and gearshift (if present), is likely to weigh only a few hundred kilogrammes. This therefore allows the motor driven body (usually the rear one) to carry a greater payload than if it had its own engine.

The gearshift matched to the motor/generator has a variable gear ratio, with a high well above 10:1, for instance between 15–20:1. With a relatively limited motor torque, a suitably high gear ratio allows a relatively small motor to drive a heavy vehicle, even by itself. Also the high gear ratio is useful for moving the body (with motor) slowly so as to ensure a smooth couple/uncouple operation of the twin bodies when needed.

In the above embodiments the engine 26, 126, 226 is a diesel engine, although, amongst others, a petrol or other thermal engine can be used. In the above the engine provides direct mechanical power to the drive train, "parallel" to the drive power provided by the motor/generator 60 when both bodies are articulated. This is termed a "parallel hybrid".

In the above embodiments the engine is in the front body and the motor in the rear. Alternatively, the front body can host a motor while the rear body hosts an engine. In the broader aspect of the invention, both bodies can be driven by way of an engine or both can be driven by way of a motor (including the possibility of both having an engine and motor). Thus both bodies can be the same. Further, whilst only two bodies have been shown, the invention is also applicable to a train of individual tracked bodies, there being three or more of these articulated together. Although in the above, the motor/generator is embodied with a battery or battery bank as its power source, it could be powered by a fuel cell pack, or super-capacitor or other means or a combination of various of them.

The two bodies have been shown to be both wheeled or tracked. The invention also encompasses the possibility of one being tracked while the other is wheeled, and/or half-tracked bodies.

Figure 4:
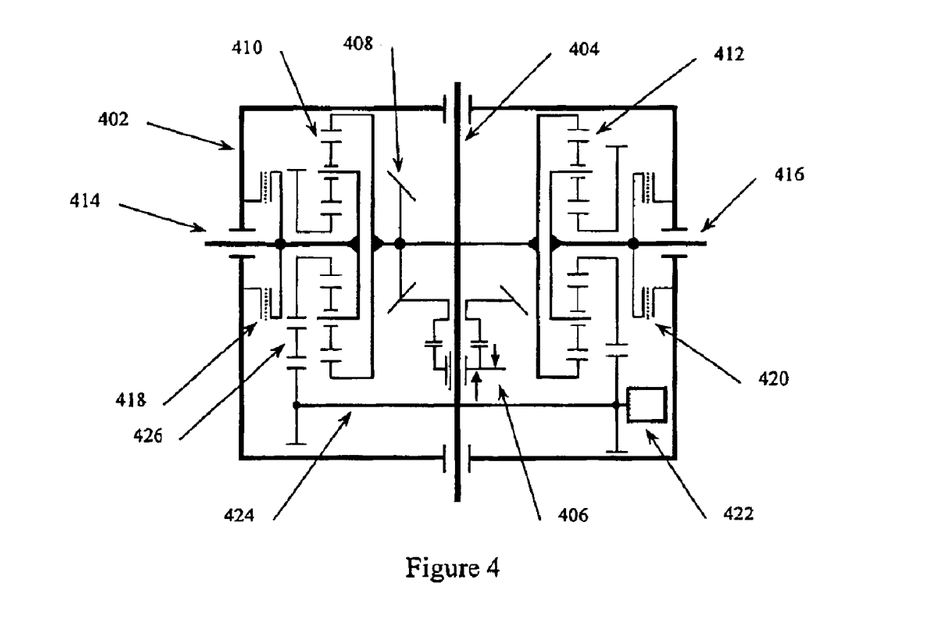
FIG. 4 is a schematic view of a drive unit of another embodiment of the invention, which is also used in the earlier embodiments of the present invention.

The front integrated drive unit 34 of FIG. 1 is shown in more detail in FIG. 4. A gearbox casing 402 surrounds the unit. The drive shaft 28 enters the gearbox casing as an input shaft 404, which passes straight through the drive unit 34. Power is taken out from the input shaft 404 by way of a clutch mechanism 406. This is translated into drive rotation by bevel gears 408. Left and right epicyclic geartrains 410, 412 provide the drive rotation to left and right output shafts 414, 416 through left and right brakes 418, 420. The left and right outputs drive the left and right sprockets 22, 24 of FIG. 1. An hydraulic steering motor 422 drives a steering (zero) shaft 424 which links to the center gears of the left and right epicyclic geartrains, with the left-hand side having an intervening bridging gear 426. The hydraulic motor 422 takes its power from the hydraulic pump 44. When pivot steer is required (when the two bodies are separated and require turning), the clutch mechanism 406 is released and the hydraulic motor 422 drives the steering shaft 424, causing the left and right output shafts 414, 416 to rotate at the same speed but in different directions.

The integrated unit 34 is capable of regenerative traction control for steering, drive drifting control, pivot turning and integrated braking. Regenerative steering is achievable by using the steering motor 422 to tip the balance of the zero steering shaft 424 to transfer kinetic energy from one side to the other. Drifting control is not a problem and is not necessary when the two bodies are articulated together, since the UC ratio of the overall vehicle is too high for drift to occur, thus the steering pump 44 is set at neutral and does not provide any power to the steering motor 422. However, for a separated body, if turning is not commanded (for example if the steering wheel is not activated while two track bands [or wheels] on the two sides of the body are experiencing uneven resistance) the steering pump 44 provides a "locking" pressure to the steering motor 422 to prevent the zero shaft 424 from unexpected rotation. Integrated braking is achieved through the left and right brakes 418, 420.

The clutch 406 can decouple the input shaft 404 from the bevel gear 408, and thus from the output shafts 414, 416. For example this may allow battery recharge when the vehicle is parked. The input shaft 404 can be provided with power from either end 404A, 404B to drive the output shafts. Whilst the input shaft is shown as passing all the way through, there could be a less direct link between the two ends 404A, 404B, for instance its own set of bevel gears. Although the shaft (or separate shafts) are referred to here as a single power input shaft, there are the possibilities of one end being a power in and the other being a power out or both ends being power in (or possibly both being power out, for instance if the vehicle is free wheeling).

The rear drive unit 74 of the first embodiment, the front drive unit 134 of the second embodiment and/or the two drive units 234, 274 of the third embodiment are usefully of the same or a similar design as the front drive unit 34 of the first embodiment, although possibly at least partial mirror images (for example moving the bevel gear 408 from one side to the other), to allow for power input rotation be in the opposite direction, to drive the bodies in the same direction. Other designs may also be used as desired.

The drive transmission of FIG. 4 is ideally suited for use in the articulated vehicles of the first three embodiments. However, it can also be used in non-articulated vehicles. It may also find uses in non-vehicular drives.

Figure 5:
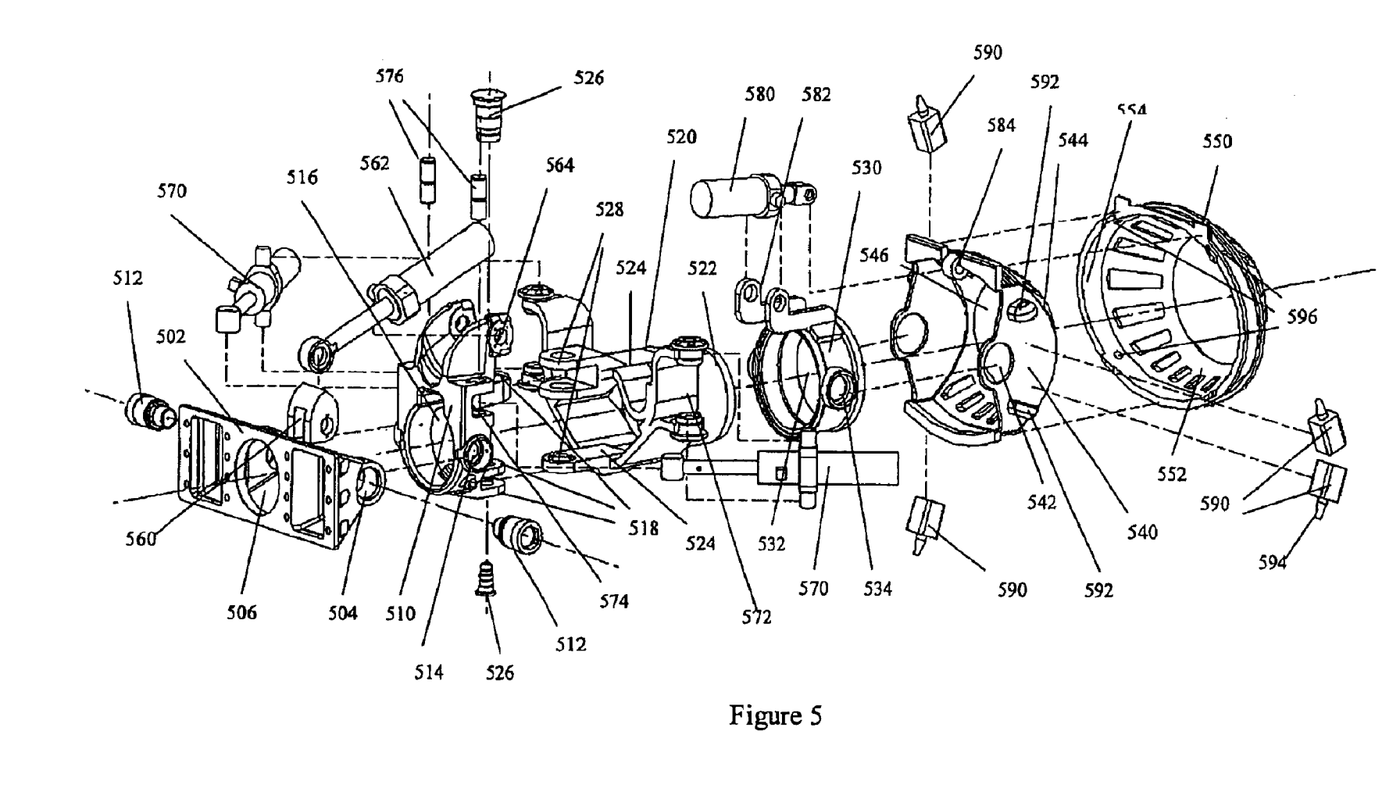
FIG. 5 is an exploded view of the articulation device of another embodiment of the invention, which is also used in the earlier embodiments of the present invention.
Figure 6:
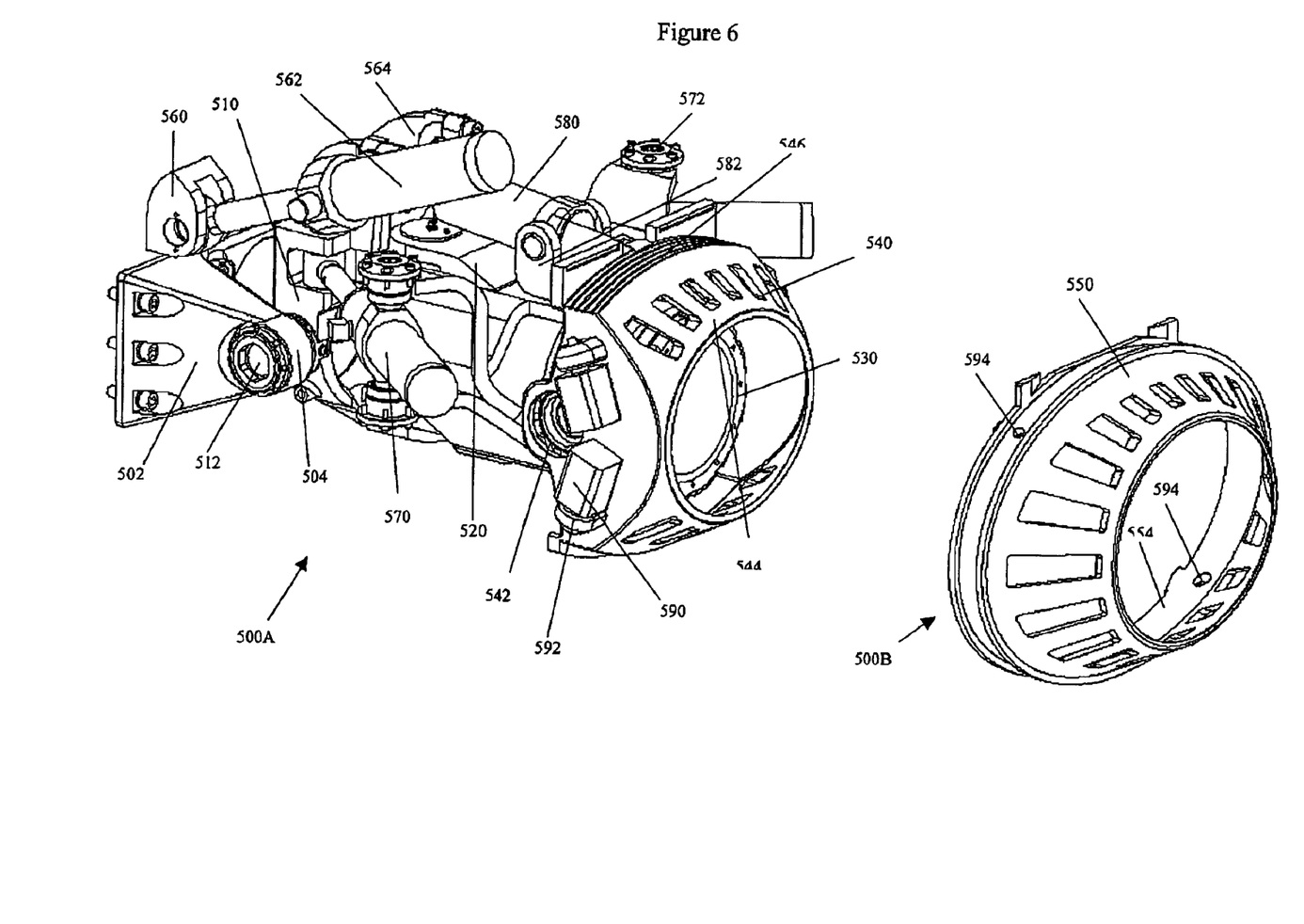
FIG. 6 shows the completed articulation portions shown in exploded view in FIG. 5.

FIGS. 5 and 6 show details of the articulation portions 500A, 500B of an articulation device 16 allowing pitch, yaw and roll. This is in accordance with a further aspect of the invention. The articulation device shown has six main components, a front bracket 502, a pitch and yaw block 510, a roll wing 520, a roll housing 530 and a front release block 540, which together make up the front portion 500A of the articulation device, and a rear release mounting 550, which constitutes the rear portion 500B of the articulation device. They are shown separately in the exploded view of FIG. 5 and mounted together in FIG. 6.

Each of the six main components of the articulation device 16 has a hole through it to allow the articulation shafts to pass through without hindrance. The holes are at the neutral axes of the articulation portions and are sized to reduce or ensure no interference between any of the components and the articulation shafts, whatever the angle and configuration.

The front bracket 502, in use, is mounted directly onto the rear of a front body, which is to be articulated to a rear body. For instance the front bracket 502 may be mounted onto the rear of the front body 12 of the first embodiment. The front bracket 502 has a pair of aligned pitch lugs 504 on it, in the x-axis (sideways), to allow pivotal connection to the next component, the pitch and yaw block 510. The pitch lugs 504 are on either side of the articulation shaft hole 506.

The pitch and yaw block 510 is mounted on the front bracket 502, by way of two separate pins 512 in the front bracket's pitch lugs 504 co-operating with corresponding pitch recesses 514 in the pitch and yaw block 508 in line with those lugs 504. The pitch recesses 514 are on either side of the articulation shaft hole 516. This connection allows pitch motion between the front bracket 502 and the pitch and yaw block 510. The pitch and yaw block 510 additionally includes three aligned yaw lugs 518 in the z-axis (upwards), to allow pivotal connection to the next component, the roll wing 520. Two of the yaw lugs are on one side of the articulation shaft hole 516 and the other one is on the other side.

The roll wing 520 has an annular ring 522 at its rear end, forward from which extend two arms 524 in the y-axis (front to back) direction. The roll wing 520 is mounted on the pitch and yaw block 510, by way of two separate pins 526 in the pitch and yaw block's yaw lugs 518 co-operating with corresponding yaw lugs 528 at the ends of the roll wing's arms 524, in line with the pitch and yaw block's yaw lugs 518. There are three aligned yaw lugs 528 in the roll wing 520 in the z-axis. Two of the yaw lugs are on one side of the articulation shaft hole, one on either side of the separate yaw lug 518 of the pitch and yaw block 510 and the other one is on the other side, placed between the two other yaw lugs 518 of the pitch and yaw block 510. This allows yaw motion between the pitch and yaw block 510 and the roll wing 520.

The annular ring 522 of the roll wing 520 sits within an annular ring of the roll housing 530. A detent (not shown) prevents relative axial movement between them whilst allowing relative roll motion rotation about the y-axis. A pair of external pitch recesses 534 sit on the outside of the annular ring of the roll housing 530 to connect it to the next component, the front release block 540.

The front release block 540 is mounted on the roll housing 530 by way of two separate pins (not shown) in the front release block's pitch lugs 542 co-operating with the external pitch recesses 534 of the roll housing 530 in line with those lugs. This allows pitch motion between the roll housing 530 and the front release block 540.

The front release block 540 has a pair of straight flat sides, with one pitch lug 542 on each side and the two pitch lugs 542 facing each other across the articulation shaft hole 546. The rear face 544 of the front release block 540 is convex. From a rear view, the perimeter of the front release block 540 has two flat edges linked by convex top and bottom edges, formed from the arc of a non-circular ellipse. Convex top and bottom mating bands 546 of the same arcs as the top and bottom edges extend forwards from the top and bottom edges. The rear face 544 is generally of the shape of a portion of an ellipsoid (roughly corresponding to half an ellipsoid with its end and two sides cut off perpendicular to the main axes).

The front release block 540 forms the rear end of the front articulation portion 500A, whilst the front bracket 502 forms its front end. The various connections disposed between them allow two different pitch motions, as well as roll and yaw between the front release block 540 and the front bracket 502.

The rear release mounting 550 is mounted onto the front of a rear body to be articulated, for instance onto the front of the rear body 14 of the first embodiment.

Figures 7, 8A, 8B, 8C:
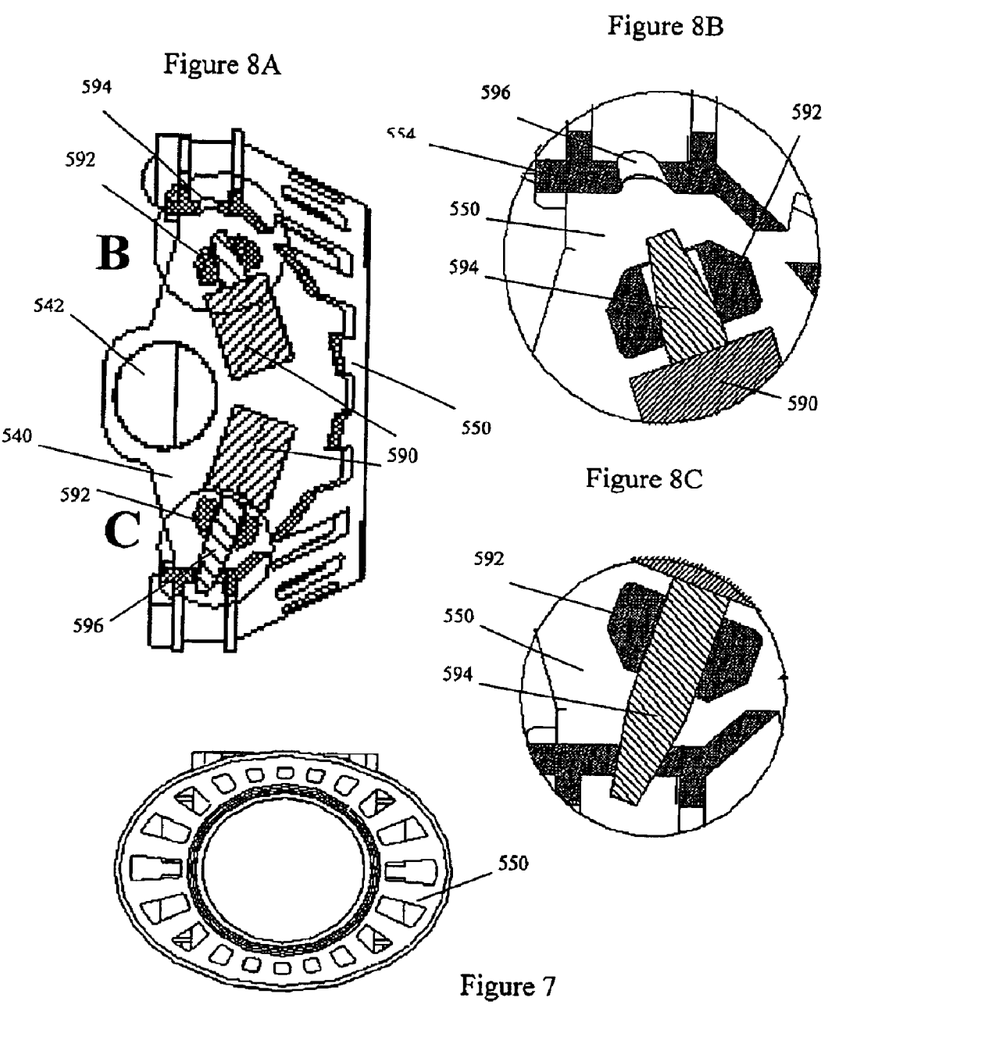
FIG. 7 is a rear view of one of the articulation portions of FIG. 5.
FIGS. 8A to 8C show portions of the quick release mechanism of the articulation device of FIG. 5.

FIG. 7 is a rear view of the rear release mounting 550, which is generally elliptical in outline. It is generally concave (from the front), with a front facing internal face 552 surrounded by an elliptical mating band 554 around its forward edge. The internal face 552 generally forms a portion of an ellipsoid (roughly corresponding to half an ellipsoid with its end cut off perpendicular to the main axis).

The convex surface 544 and mating bands 546 of the front release block 540 fits within the internal face 552 and mating band 554 of the rear release mounting 550, there being a close fit between the outer surfaces of the mating bands 546 of the front release block 540 and the inner surface of the mating band 554 of the rear release mounting 550. When the front release block 540 and the rear release mounting 550 are fitted together, however, there is a gap between the rear face 544 of the front release block 540 and the internal face 552 of the rear release mounting 550 for dirt and mud to escape.

When the front and rear articulation portions 500A, 500B are engaged, the rear face 544 and mating bands 546 of the of the front release block 540 sit within the internal face 552 and mating band 554 of the rear release mounting 550, with the mating bands in contact. The front and rear articulation portions 500A, 500B are fixed together as is described later, preventing relative axial movement between them as well as relative pitch, yaw and roll motion.

The matching elliptical shapes of the mating bands and the convex and concave faces of the front release block 540 and the rear release mounting 550 allow self alignment of the front and rear articulation portions 500A, 500B to make coupling easier. The arcs of the outer surfaces of the mating bands 546 of the front release block 540 match the arc of the inner surface of the mating band 554 of the rear release mounting 550 at those opposing portions of the rear release mounting mating band 554 with the largest radii of curvature. Thus there is only one position and relative orientation that matches and, provided free movement of the front release block 540 is permitted, it will find that position and orientation when meeting the rear release mounting 550. This would not happen if the shapes of the bands were based on a circle, as several orientations would be possible. Although that would not matter if orientation is not deemed to be critical. Other shapes may also be used to provide self-alignment. Thus, using this articulation device, when the rear body is driven towards the front body, contact of the rear face 544 of the front release block 540 with the internal face 552 of the rear release mounting 550 will automatically lead to initial correct alignment to a certain tolerance, allowing quick coupling. The mating bands 546, 554 will complete the alignment.

It may be preferable to drive the rear body up to the stationary front body, as the motor is easier to control for lower speeds, to prevent accidents. It also makes it easier for the front body and rear body articulation shafts 50, 96 to couple together. For this to occur, it is advisable to decouple the front body rear drive shaft 48 from the output shafts 36, 38 of the front drive unit 34, using the clutch 406 within the front drive unit 34, so that when the rear body articulation shaft 96 (which is turning as the rear body moves forward) engages and couples with the front body articulation shaft, it does not move the whole vehicle forward.

The front body articulation shaft 50 extends through the front articulation portion 500A. It meets the rear body articulation shaft 96 within the axial length of the front release block 540 and spline fits into a recess in the end of the rear body articulation shaft 96, so that rotation by either articulation shaft is transmitted to the other.

The connection mechanism between the front release block 540 and the rear release mounting 550, and thereby the front and rear articulation portions 500A, 500B is shown in more detail in FIGS. 8A–8C. FIG. 8A is a partial cutaway view of the front release block 540 and the rear release mounting 550, when in contact together. FIG. 8B is an enlarged view of the portion B of FIG. 8A and FIG. 8C is an enlarged view of the portion C of FIG. 8A.

A pair of coupling actuators 590 is provided on both side faces of the front release block 540. Each coupling actuator 590 is mounted against a guide block 592 and has a piston 594 which passes through the respective guide block 592 and is operable to extend into a corresponding coupling hole 596 in the rim of the rear release mounting 550. When all four pistons extend into their corresponding coupling holes 596 (FIGS. 8A and 8C show one such piston so extended), the front release block 540 and the rear release mounting 550, and thereby the front and rear bodies, are firmly coupled together. When all four pistons are retracted out of their corresponding coupling holes 596 (FIGS. 8A and 8B show one such piston so retracted), the front release block 540 and the rear release mounting 550, and thereby the front and rear bodies, are completely free to separate.

The coupling actuators 590 are all controlled from the front body (or from the rear body if the articulation device is turned round). Coupling and decoupling is achieved quickly without any manual connection or disconnection. Thus no one even needs to get out of either body to achieve this.

Whilst a specific arrangement of actuators is shown, other arrangements may also be used to provide quick coupling and/or decoupling The above arrangement of the articulation device arrangement provides two axes of pitch movement, together with an orthogonal axis of yaw movement and a further orthogonal axis of roll movement. However, the design may be simplified, for instance having only one pitch axis and the order of the arrangement can be rearranged.

The articulation device 16 is active, with two pitch controls using separate hydraulic actuators and single yaw control using two further hydraulic actuators. The actuators are controlled from the front body (or the rear body if the articulation device is turned around).

A pitch control bracket 560 is mounted on the front bracket 502. The front piston end of a first hydraulic actuator 562 is rotatably mounted within the front bracket 502. The cylinder end of the first hydraulic actuator 562 is rotatably mounted on pitch control lugs 564 on the top of the pitch and yaw block 510. This first hydraulic actuator 562 controls the relative pitch between the front bracket 502 and the pitch and yaw block 510.

Two second hydraulic actuators 570 are mounted on the roll wing 520 and the pitch and yaw block 510. The cylinder end of each second hydraulic actuator 570 is rotatably mounted on a pair of side yaw control lugs 572, with one pair of side yaw control lugs 572 on each side of the roll wing 520. The front piston ends of the second hydraulic actuators 570 are rotatably mounted within yaw control recesses 574 within the pitch and yaw block 510, one recess on each side, and held in place by pins 576. The second hydraulic actuators 570 control the relative yaw between the pitch and yaw block 510 and the roll wing 520.

The cylinder end of a third hydraulic actuator 580 is rotatably mounted on pitch control lugs 582 on the top of the roll housing 530. The front piston end of the third hydraulic actuator 580 is rotatably mounted on a pitch control lug 584 of the front release block 540. This third hydraulic actuator 580 controls the relative pitch between the roll housing 530 and the front release block 540.

Whilst the yaw actuators, being the second actuators 570, are used to provide steering, the two pitch actuators have various other uses. For instance, they can be used to damp pitch movement, particularly over very bumpy ground. They can also be used to adjust the angle at which either body floats during amphibious use (if the centers of gravity are such that either body floats at an undesired angle). They also allow improved crossing of obstacles, for instance by allowing the articulated vehicle to behave as a rigid body when crossing a large gap, such as a crevasse or trench, or by allowing the front of the front body to be raised to allow it to climb over a wall more easily.

The articulation device has been described so far for articulating two tracked bodies or two wheeled bodies. However, this aspect of the invention is not limited thereto. It encompasses the articulation device for other uses, for instance to couple two tug boats together. It also encompasses uses where two vehicular bodies are not coupled, for instance in connecting a bulldozer blade or a scoop to a bulldozer body. It may even encompass uses where neither body is a vehicle. In many of these uses, no articulation shaft or propeller shaft will need to pass through the articulation device and it can be designed and constructed accordingly.

Thus one aspect of the invention provides an articulated tracked vehicle with improved maneuverability and speed, as well as the ability for both bodies to operate independently simultaneously. This could be advantageous in dangerous terrain, for instance over ice, where one of the bodies, for instance an unmanned rear one could be sent ahead to test the viability of the route. The safety aspect is improved if at least the one that is sent ahead can be driven remotely from the other, for instance by radio, or even over lengths of wires connecting them together.

Another aspect of the invention provides a drive transmission that allows traction control whilst also permitting two power inputs or one input and an additional output.

A further aspect of the invention provides an articulation device that allows quick coupling and/or decoupling. It also or instead gives rise to self-alignment of the two parts of the articulation device.

Whilst specific embodiments have been described, the invention is not limited thereto. It also encompasses equivalents and other structures and method that fall within the scope of the accompanying claims as well as the invention as it is understood from a suitable generalization of this text and the accompanying drawings.

What is claimed is:

1. An articulated vehicle comprising at least a first vehicle body and a second vehicle body, with a releasable articulation device therebetween; wherein
   the first vehicle body comprises a first drive means for driving the first vehicle body when it is separate from the second vehicle body;
   the second vehicle body comprises a second drive means for driving the second vehicle body when it is separate from the first vehicle body;
   the first drive means is operable to drive both the first and second vehicle bodies when the first drive vehicle body is articulated thereto;
   the second drive means is operable to drive both the first and second vehicle bodies when the second vehicle body is articulated thereto; and
   the first and second vehicle bodies are independently steerable when separate.

2. A vehicle according to claim 1, wherein the articulation device is operable to couple the first and second drive means together.

3. A vehicle according to claim 1, wherein, when the first and second vehicle bodies are articulated together the second drive means is further operable to provide additional to complement the drive power provided by the first drive means.

4. A vehicle according to claim 1, wherein the first drive means comprises an engine.

5. A vehicle according to claim 1, wherein the second drive means comprises a motor.

6. A vehicle according to claim 5, wherein the second drive means further comprises a generator.

7. A vehicle according to claim 6, wherein, when the first and second vehicle bodies are articulated together, the second drive means is further operable to generate electricity, being driven by the first drive means.

8. A vehicle according to claim 6, wherein, when the first and second vehicle bodies are articulated together, the second drive means is further operable to brake at least the first vehicle body by braking the first drive means through regenerative braking.

9. A vehicle according to claim 1, wherein at least one of said vehicle bodies is tracked.

10. A vehicle according to claim 9, being a tracked vehicle wherein the first and second vehicle bodies are tracked vehicle bodies.

11. A vehicle according to claim 9, wherein the first and second vehicle bodies are steerable via active articulated yaw control to initiate a relative angle therebetween when articulated together.

12. A vehicle according to claim 9, wherein the or each tracked vehicle body is steerable via skid steering when separate.

13. A vehicle according to claim 9, wherein the or each tracked vehicle body is steerable via regenerative traction control when separate.

14. A vehicle according to claim 1, wherein the articulation device is operable to allow quick release and separation of the first and second vehicle bodies from within at least one of the first and second vehicle bodies.

15. A vehicle according to claim 1, wherein at least one of the first and second drive means comprises:
   a first power input means;
   a second power input means coupled to the first power input means; and
   two power output shafts, coupled to at least the first power input means through a clutch; wherein
   the first power input means is operable to input power without additional power being provided by the second power input means, the second power input means is operable to input power without additional power being provided by the first power input means and the second power input means is operable to input power in addition to power provided by the first power input means.

16. A vehicle according to claim 1, wherein the articulation device comprises first and second articulation portions, couplable to and releasable from each other by the operation of one or more actuators.

* * * * *

UNITED STATES PATENT AND TRADEMARK OFFICE
CERTIFICATE OF CORRECTION

PATENT NO. : 6,880,651 B2
DATED : April 19, 2005
INVENTOR(S) : Heng Fong Loh et al.

It is certified that error appears in the above-identified patent and that said Letters Patent is hereby corrected as shown below:

Column 5,
Line 8, before "which" delete "UC>2," and insert therefor -- L/C>2, --.

Column 7,
Line 21, before "ratio" delete "UC" and insert therefor -- L/C --.

Column 12,
Line 9, after "additional", insert therefor -- power --.

Signed and Sealed this

Fifteenth Day of November, 2005

JON W. DUDAS
*Director of the United States Patent and Trademark Office*